United States Patent
Bitou (10) Patent No.: US 8,571,597 B2
(45) Date of Patent: Oct. 29, 2013

(54) MOBILE INFORMATION TERMINAL EXECUTING APPLICATION PROGRAM

(75) Inventor: Takahiro Bitou, Osaka (JP)

(73) Assignee: Kyocera Corporation, Kyoto (JP)

( * ) Notice: Subject to any disclaimer, the term of this patent is extended or adjusted under 35 U.S.C. 154(b) by 847 days.

(21) Appl. No.: 11/635,049

(22) Filed: Dec. 7, 2006

(65) Prior Publication Data

US 2007/0135105 A1    Jun. 14, 2007

(30) Foreign Application Priority Data

Dec. 9, 2005    (JP) .................................. 2005-357040

(51) Int. Cl.
| | |
|---|---|
| H04M 11/04 | (2006.01) |
| H04M 3/42 | (2006.01) |
| H04M 3/00 | (2006.01) |
| H04M 1/00 | (2006.01) |

(52) U.S. Cl.
USPC ................. 455/550.1; 455/404.1; 455/414.1; 455/418

(58) Field of Classification Search
USPC .......... 455/3.04, 404.1, 410, 414.1, 418, 423, 455/425, 517, 550.1, 556.2, 558, 567; 377/16, 28, 30–31, 51, 107, 110; 710/260–262; 713/1, 2, 100
See application file for complete search history.

(56) References Cited

U.S. PATENT DOCUMENTS

| | | | | |
|---|---|---|---|---|
| 5,349,338 A | * | 9/1994 | Routman et al. | 340/692 |
| 5,576,650 A | * | 11/1996 | Hirotani et al. | 327/142 |
| 2003/0054853 A1 | * | 3/2003 | Kouchiyama et al. | 455/522 |

FOREIGN PATENT DOCUMENTS

| | | | |
|---|---|---|---|
| EP | 0679981 B1 | * | 11/1995 |
| JP | 03-156515 | | 7/1991 |
| JP | 5-3005 A | | 1/1993 |
| JP | 06-175751 | | 6/1994 |
| JP | 7-295687 | | 11/1995 |
| JP | 2003-316477 | | 11/2003 |
| JP | 2004-140457 A | | 5/2004 |
| WO | WO 2004021154 A1 | * | 3/2004 |

OTHER PUBLICATIONS

Document 50100963928 which is a translation of publication JP2003-015780 (2003) which is the publication of patent application JP2001-200947 (2001) filed by Tomomi, et al.*
JP 2011048469 Office Action mailed Sep. 18, 2012.
Notice of Ground for Rejection (translation) for JP 357040/2005, mailed Jan. 11, 2011, 3 pages.

(Continued)

*Primary Examiner* — Meless Zewdu
(74) *Attorney, Agent, or Firm* — Duane Morris LLP (57) ABSTRACT

In order to control the resetting operation, a mobile phone is provided with a CPU capable of executing an application program, a power switch to receive an instruction for switching power between the ON state and the OFF state, and a reset detecting circuit to output a resetting signal for rebooting the CPU when the power switch is closed for a predetermined period of time. The CPU outputs a state signal denoting either a resettable state or a non-resettable state of the CPU. The reset detecting circuit includes an AND element to output to a resetting circuit a high signal (resetting signal) on condition that the state signal denotes the state of the CPU as resettable. The resetting circuit outputs to the CPU a low signal (resetting signal) upon input of the high signal (resetting signal) from the reset detecting circuit.

14 Claims, 7 Drawing Sheets

(56) References Cited

OTHER PUBLICATIONS

Office Action dated Aug. 20, 2013 issued in Japanese Patent Application No. 2012-253627, which is a divisional application of the corresponding Japanese Patent Application (statement of relevance included), 5 pages.

\* cited by examiner

MOBILE INFORMATION TERMINAL EXECUTING APPLICATION PROGRAM

This application is based on Japanese Patent Application No. 2005-357040 filed with Japan Patent Office on Dec. 9, 2005, the entire content of which is hereby incorporated by reference.

BACKGROUND OF THE INVENTION

1. Field of the Invention

The present invention relates to a mobile information terminal, and particularly to a mobile information terminal executing application programs.

2. Description of the Prior Art

In recent years, mobile phones have had improved functions, making them usable as radios, audio apparatuses, game consoles, and the like. In order to operate mobile phones as radios, audio apparatuses, game consoles, and the like, the central processing units mounted in the mobile phones execute various application programs. However, there are cases where the central processing units run away due to bugs in application programs or unexpected operations. When the central processing unit runs away, it cannot reset itself. Thus, when power is operated by monitoring using software, even disconnection of power is impossible. Although the runaway can be prevented by clearing a watch dog timer mounted in the central processing unit, this method is not effective in the case where the central processing unit runs away while clearing the watch dog timer. In these cases, there has been no way to stop the runaway but to cut off power supplied to the central processing unit by, for example, removing the battery, which is mounted as the power source for the mobile phone.

Japanese Patent Application Publication No. 5-3005 describes a resetting device to reset a computer using a resetting switch. The resetting device includes a resetting switch, an interruption-demand-signal outputting portion to, in response to a resetting signal from the resetting switch, output to the computer an interruption demand signal for interrupting a computer system in order to cause the computer system to execute a software resetting operation, a trigger signal outputting portion to output a trigger signal when the resetting signal lasts for a predetermined period of time, and a resetting signal outputting portion to, in response to the trigger signal, output a hardware resetting signal to the computer system in order to cause the computer system to execute a hardware resetting operation.

However, when the computer is reset while an application program is being executed without runaway of the central processing unit, data that has been processed so far in the central processing unit can be lost, or the application program can be discontinued without writing data that has been set. This causes failure of the program which cannot be booted normally the next time power is supplied.

SUMMARY OF THE INVENTION

The present invention has been accomplished in order to solve the above problems, and it is an object of the present invention to provide a mobile information terminal capable of controlling the resetting operation.

In order to accomplish the above object, a mobile information terminal according to an aspect of the present invention includes: a controlling portion capable of executing an application program; a switch to receive an instruction for switching power between an ON state and an OFF state; and a resetting portion to output a resetting signal for rebooting the controlling portion when the switch is closed for a predetermined period of time, wherein: the controlling portion includes a state-signal outputting portion to output a state signal denoting either a resettable state or a non-resettable state of the controlling portion: and the resetting portion includes a judging portion to output to the controlling portion the resetting signal on condition that the state signal denotes the state of the controlling portion as resettable.

The foregoing and other objects, features, aspects and advantages of the present invention will become more apparent from the following detailed description of the present invention when taken in conjunction with the accompanying drawings.

BRIEF DESCRIPTION OF THE DRAWINGS

Embodiments of the present invention will be described below referring to the drawings. In the following description, parts having like functions and names will be denoted with like numerals, and therefore description thereof will not be repeated.

<First Embodiment>

Figure 1:
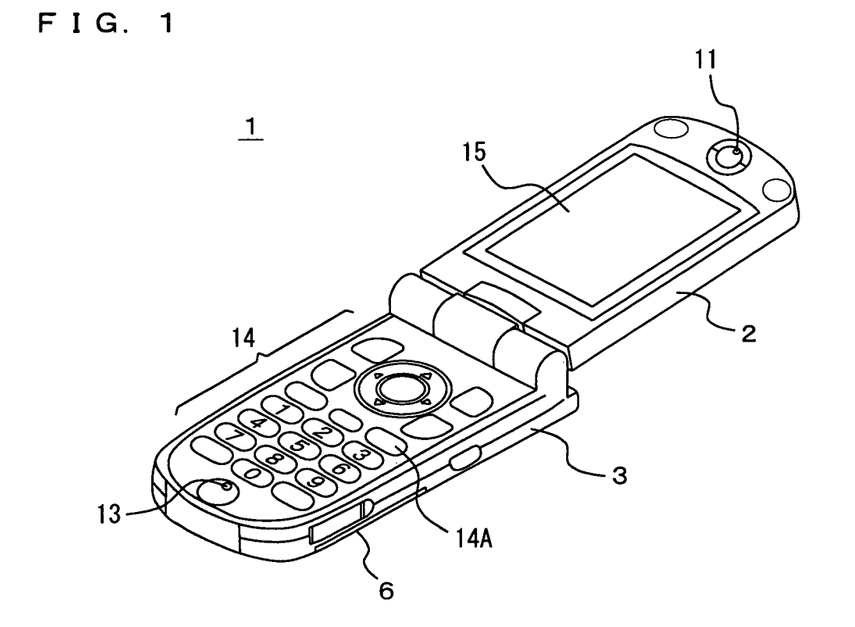
FIG. 1 is a perspective view of the appearance of a mobile phone according to a first embodiment of the present invention.

FIG. 1 is a perspective view of the appearance of a mobile phone according to a first embodiment of the present invention. Referring to FIG. 1, a mobile phone 1 includes an operation side portion 3 and a display side portion 2. Arranged on the inner surface of the operation side portion 3 are operation keys 14 including a power key 14A, numeric keys, and dial keys, and a microphone 13. Arranged on the inner surface of the display side portion 2 are a liquid crystal display (LCD) device 15 and a first speaker 11. While the case where the mobile phone 1 is provided with the LCD 15 is exemplified here, an organic EL (Electro Luminescence) display can be used instead of the LCD 15. The operation side portion 3 and the display side portion 2 are rotatably connected to each other with a hinge mechanism, thus making the mobile phone 1 openable and closable.

Figure 2:
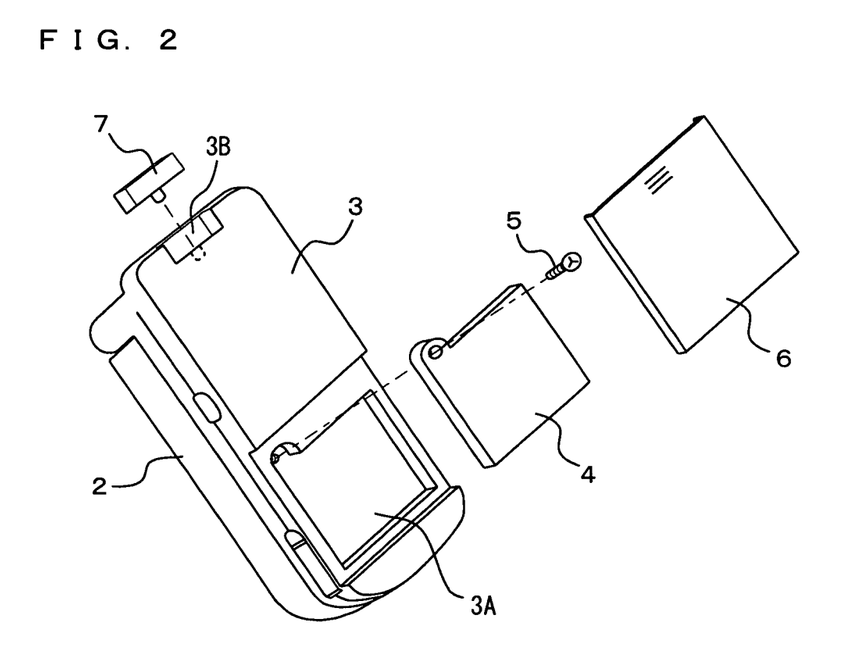
FIG. 2 is an exploded perspective view of the mobile phone according to the first embodiment.

FIG. 2 is an exploded perspective view of the mobile phone according to the first embodiment. In the figure, the outer surface of the operation side portion of the mobile phone 1 in the closed state is viewed in perspective from an upper direction. Referring to FIG. 2, the mobile phone 1 includes, on the outer surface of the operation side portion 3, a storing portion 3A to store a battery 4 and a switch storing portion 3B in which a switch opening piece 7 is mounted. The mobile phone 1 is provided with a security buzzer: when the switch opening piece 7 is in the state of being mounted in the switch storing portion 3B, a security-buzzer operating circuit is opened, and when the switch opening piece 7 is pulled out from the switch storing portion 3B, the security-buzzer operating circuit is closed and the security buzzer buzzes. The battery 4 is stored and fixed in the storing portion 3A using a screw 5 to prevent easy removal of the battery 4. This is to prevent the buzzing of the security buzzer from being easily stopped by removing the battery 4. With the battery 4 fixed in the storing portion 3A, a lid 6 covers the storing portion 3A. The lid 6 is mounted on the operation side portion 3 by caulking.

Figure 3:
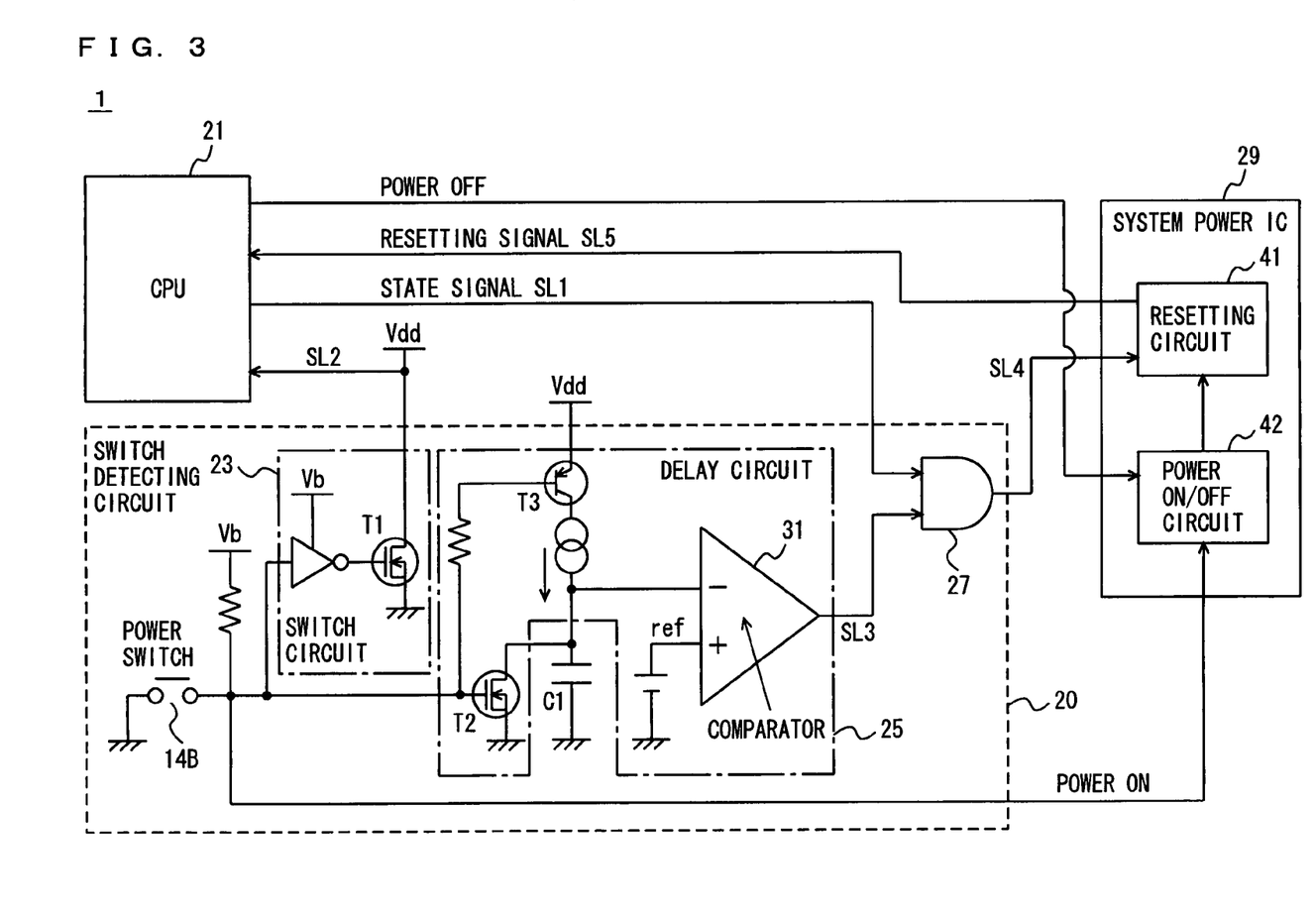
FIG. 3 is a block diagram of a mobile phone 1 according to the first embodiment including a reset detecting circuit.

FIG. 3 is a block diagram of the mobile phone 1 according to the first embodiment including a reset detecting circuit. Referring to FIG. 3, the mobile phone 1 includes a central processing unit (CPU) 21 to control the mobile phone 1 as a whole, a system power IC (Integrated Circuit) 29, and a reset detecting circuit 20. The reset detecting circuit 20 includes a power switch 14B, a switching circuit 23 connected to the power switch 14B, a delay circuit 25 connected to the power switch 14B, a capacitor C1 connected to the delay circuit 25, and an AND element 27 into which an output of the delay circuit 25 is input.

The system power IC 29 includes a resetting circuit 41 and a power ON/OFF circuit 42. The power ON/OFF circuit 42 switches the mobile phone 1 between the ON state and the OFF state. In the ON state, the power ON/OFF circuit 42 applies voltage Vdd to each circuit of the mobile phone 1. In the OFF state, the power ON/OFF circuit 42 does not apply voltage Vdd to any circuits of the mobile phone 1.

The power switch 14B is closed while the power key 14A is pressed, and opened while the power key 14A is not pressed. The switching circuit 23 is applied with voltage Vb no matter whether the mobile phone 1 is kept in the ON state or the OFF state by the system power IC 29, so that the switching circuit 23 can detect opening and closure of the power switch 14B. The CPU 21 is applied with voltage Vdd when the mobile phone 1 is kept in the ON state by the system power IC 29 and the power switch 14B is opened. When the power switch 14B is closed, the CPU 21 is not applied with voltage Vdd because a transistor T1 of the switching circuit 23 allows current to flow therethrough. That is, the switching circuit 23 outputs to the CPU 21 a signal SL2 that becomes low when the power switch 14B is closed and high when the power switch 14B is opened.

The CPU 21 executes application programs. While the applications programs executed by the CPU 21 are written in a program language such as C language and JAVA (registered trademark), the program language in which the application programs are written is not limited to these languages. The application programs can be written in any other languages. A plurality of application programs are installed in the mobile phone 1, and the plurality of application programs can be written in the same language or in different languages. That is, it is possible that application programs written in a plurality of program languages exist.

Further, the CPU 21 measures a period of time for which the power key 14A is continuously pressed, and if the power key 14A is pressed for a given period of time, e.g., 3 seconds, the CPU 21 outputs a power OFF signal to the power ON/OFF circuit 42 in order to turn power off.

The delay circuit 25 is connected to the capacitor C1. When the mobile phone 1 is in the ON state, voltage Vdd is applied to the emitter of a transistor T3. While the power switch 14 B is opened, voltage Vb is applied to the base of the transistor T3, and thus the transistor T3 does not allow current to flow therethrough. When the power switch 14 B is closed, the base potential is lowered, and thus the transistor T3 allows constant current to flow therethrough and the capacitor C1 is charged. In the delay circuit 25, while the mobile phone 1 is in the ON state and the power switch 14 B is closed, the capacitor C1 accumulates electric charge. The delay circuit 25 also has a transistor T2 connected to the capacitor C1, and when the power switch 14 B is released, the transistor T2 allows current to flow therethrough, and the Capacitor C1 discharges its accumulated charge. Further, the delay circuit 25 includes a comparator 31 into which the voltage of the capacitor C1 and the threshold voltage ref are input. The comparator 31 outputs to the AND element 27 a signal SL3 that becomes high when the voltage of the capacitor C1 is equal to or higher than the threshold voltage ref and low when the voltage of the capacitor C1 is lower than the threshold voltage ref.

The delay circuit 25 is set to have a longer period of time from charging of the capacitor C1 to attainment of the threshold voltage ref than the period of time measured by the CPU 21 for turning power off (i.e., the period of time for which the power key 14A is continuously pressed). This is to turn the mobile phone 1 off normally without resetting the CPU 21 when the CPU 21 is not running away.

Into the AND element 27, the signal SL 3 is input from the comparator 31 and the state signal SL 1 is input from the CPU 21. The state signal SL 1 is output from the CPU 21, and becomes high when the CPU 21 permits resetting thereof and low when the CPU 21 does not permit resetting thereof. The AND element 27 outputs to a resetting circuit 41 a signal SL4 that becomes high when the voltage of the capacitor C1 is equal to or higher than the threshold voltage ref and when the state signal SL 1 output from the CPU 21 denotes permission of resetting, and otherwise, becomes low. A high signal SL4 is a resetting signal for resetting the CPU 21.

The resetting circuit 41 outputs to the CPU 21 a signal SL5 that becomes high when the signal SL4, which is output from the AND element 27, is low. When the signal SL4, output from the AND element 27, is high, the resetting circuit 41 outputs to the CPU 21 a low signal SL5 for a period of time during which the resetting circuit 41 causes the CPU 21 to be reset. A low signal SL5, which is output from the resetting circuit 41, is a resetting signal. When the resetting is completed, the resetting circuit 41 outputs to the CPU 21 a high signal SL5. When the signal SL5 changes from a low signal SL5 to a high signal SL5, the CPU 21 is reset to start rebooting.

Figure 4:
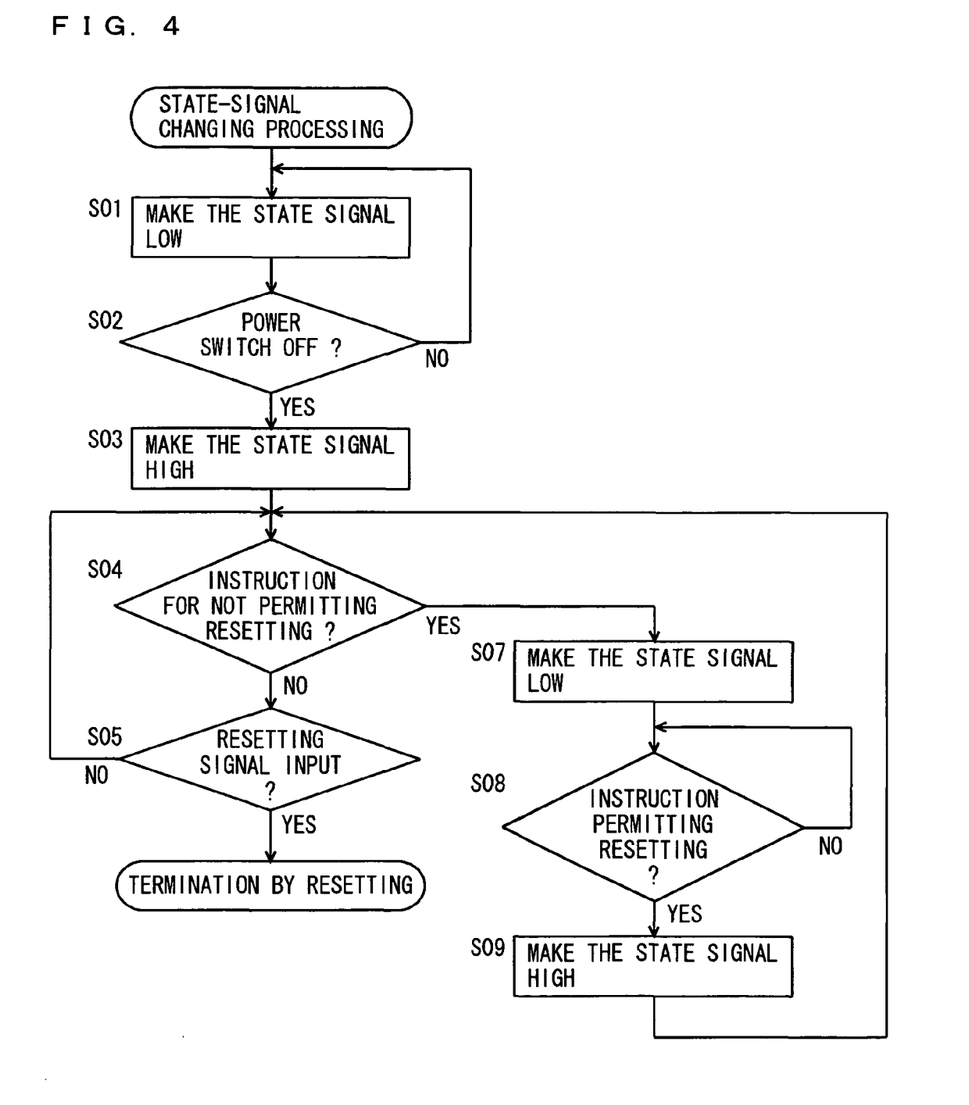
FIG. 4 is a flowchart showing the flow of a state-signal changing processing executed by the CPU.

FIG. 4 is a flowchart showing the flow of a state-signal changing processing executed by the CPU. The state-signal changing processing is executed when the CPU 21 is supplied with power and booted, or when the CPU 21 is rebooted after a resetting signal is input into the CPU 21 while being booted. The state-signal changing processing is executed continuously while the CPU 21 is in operation. Referring to FIG. 4, the CPU 21, when booted, sets the state signal SL1 to be low (step S01). A low state signal SL1 is a signal denoting that resetting is not permitted. This is to prevent the CPU 21 from being re-reset caused by the user's continued pressing of the power key 14A after resetting and rebooting the CPU 21. The CPU 21 then judges whether the power switch 14B is off (step S02). When the power switch is off, the processing proceeds to step S03, and otherwise, the processing goes back to step S01. The CPU 21 judges that the power switch 14B is off by detecting that the signal SL2, which is output from the switch circuit 23, is high. The CPU 21 keeps the state signal SL 1 low until the power switch 14B becomes off for the first time after booting.

In step S03, the CPU 21 sets the signal SL 1 to be high. A high signal SL 1 is a signal denoting permission of resetting. The CPU 21 then judges whether there is a change instruction denoting that resetting is not permitted (step S04). When there is such a change instruction, the processing proceeds to step S07, and when there is no such change instruction, the processing proceeds to step S05. The change instruction denoting that resetting is not permitted is acquired by the CPU 21 when the CPU 21 detects a situation where resetting of the CPU 21 is not preferable such as when the security buzzer is in operation and when a rewriting operation of a renewed program is executed. For example, when the CPU 21 executes an application program to operate the security buzz え r, a change instruction denoting that resetting is not permitted is acquired.

In step S05, the CPU 21 judges whether a resetting signal is input from the resetting circuit 41. When the resetting signal is not input, the processing goes back to step S04. When the resetting signal is input, the CPU 21 is reset, and following the resetting, automatically sets the state signal SL1 to be low. A low state signal SL1 is a signal denoting that resetting is not permitted.

In step S07, the CPU 21 sets the state signal to be low. The CPU 21 then judges whether there is a change instruction indicating permission of resetting (step S08). When there is such a change instruction, the processing proceeds to step S09, and otherwise, the CPU 21 turns into a stand-by state until there is such a change instruction. The change instruction denoting permission of resetting is acquired by the CPU 21 when the CPU 21 detects the end of the above-described situation where resetting of the CPU 21 is not preferable. For example, when the CPU 21 completes execution of an application program to operate the security buzzer, a change instruction denoting permission of resetting is acquired. In step S09, the CPU 21 sets the state signal SL1 to be high, and the processing goes back to step S04.

Figure 5:
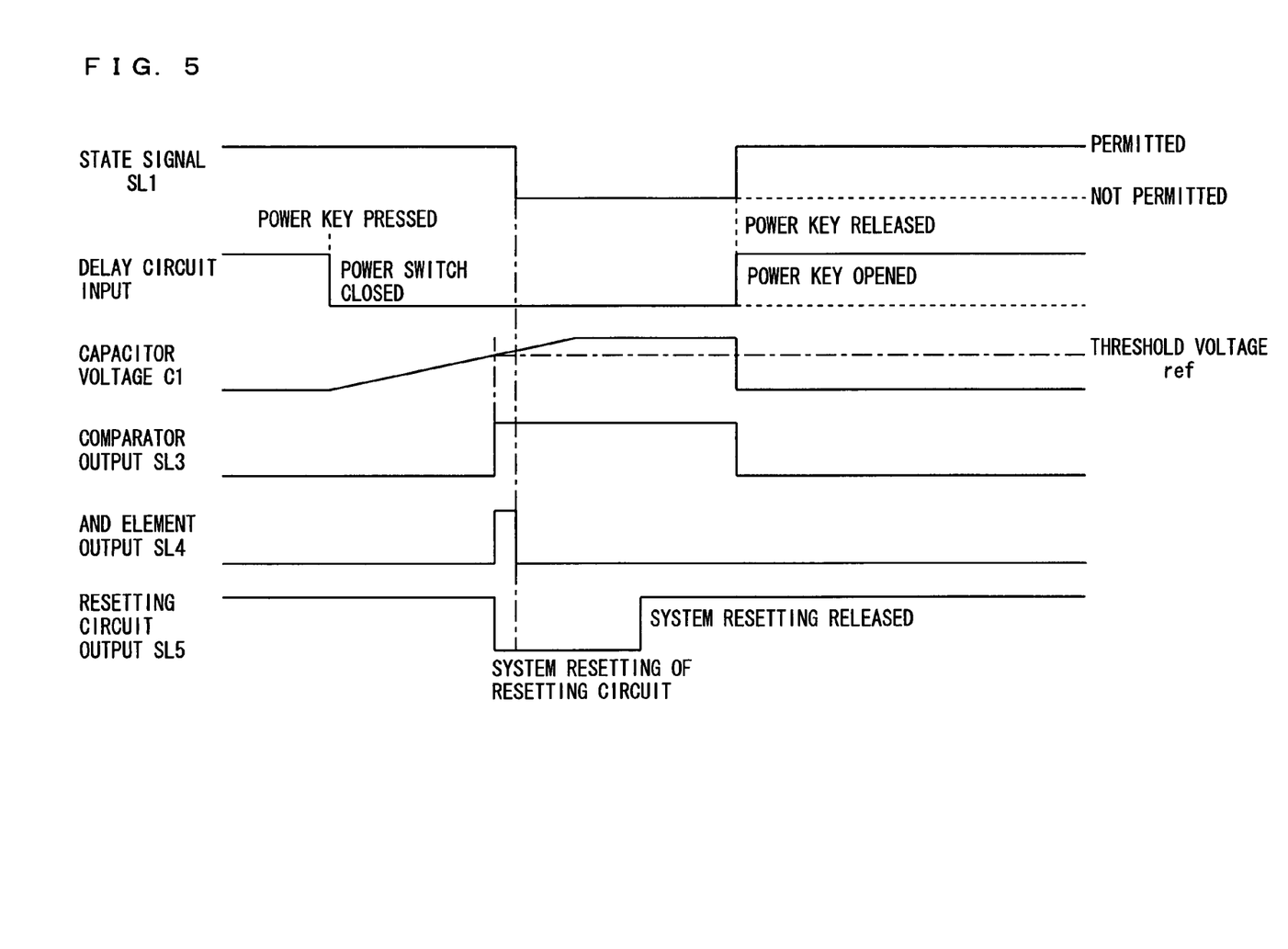
FIG. 5 is a timing chart of the reset detecting circuit.

FIG. 5 is a timing chart of the reset detecting circuit. Referring to FIG. 5, when the power key 14A is pressed and the power switch 14B is thereby closed under the state such that the state signal SL1 is set to be high by the CPU 21 executing the above-described state-signal changing processing, then the input into the delay circuit 25 is switched to a high input from a low input. This causes constant current to flow through the transistor T3 of the delay circuit 25, and charging of the capacitor C1 commences.

The comparator 31 keeps the signal SL3 low while the voltage of the capacitor C1 is lower than the threshold voltage ref. When the capacitor C1 is charged and the capacity thereof is increased and the voltage thereof reaches the threshold voltage ref, the capacitor C1 renders the signal SL3 high. The AND element 27, while a high state signal SL1 and a low signal SL3 are input therein, outputs a low signal SL4. When the signal SL3, which is output from the comparator 31, changes from a high signal SL3 to a low signal SL3, the AND element 27 renders the signal SL4 high. The resetting circuit 41, while a low signal SL4 is input therein from the AND element 27, outputs a high signal SL5 to the CPU 21. When the signal SL4, which is output from the AND element 27, changes from a low signal SL4 to a high signal SL4, the resetting circuit 41 renders the signal SL5 low. Thus, a low signal SL5, which instructs resetting of the CPU 21, is input into the CPU 21, and the CPU 21 is reset. Following the resetting of the CPU 21, the state signal SL 1 is automatically rendered low. While the CPU 21 is being reset, the resetting circuit 41 outputs a low signal SL5. When the resetting is completed, the resetting circuit 41 renders the signal SL5 high. This causes the CPU 21 to start rebooting after the resetting.

Since the CPU 21 keeps the state signal SL1 low until the power key 14A is released for the first time since booting of the CPU 21, the signal SL4, which is output from the AND element 27, is kept low and does not become high. This prevents repeated resetting of the CPU 21 when the power key 14A is continuously pressed. When the CPU 21 is reset, screens such as one on the LCD 15 are switched to initial screens, which enables the user to be notified that resetting has been accepted and when to release the power key 14A.

As described hereinbefore, in the first embodiment, the reset detecting circuit 20 outputs a high signal SL4 (resetting signal) on condition that the CPU 21 outputs a high state signal SL1, which denotes that the CPU 21 is resettable. Following the output, the resetting circuit 41 outputs a low signal SL5 (resetting signal) to the CPU 21 and the CPU 21 is thereby reset. Since the reset detecting circuit 20 does not output a high signal SL4 (resetting signal) while the CPU 21 outputs a low state signal SL1, which denotes that the CPU 21 is non-resettable, the CPU 21 is not reset. This enables it to reset the CPU 21 for rebooting only when the CPU 21 runs away due to, for example, a bug in an application program.

The reset detecting circuit 20 also includes a comparator 31 that supplies constant current to the capacitor C1 while the power switch 14B, which receives instructions for switching between the ON and OFF states of power, is closed, and that outputs a high signal SL3 while the capacity of the capacitor C1 is above a predetermined capacity. This enables it to reset the CPU 21 using a circuit independent of the CPU 21.

The CPU 21 switches the state signal SL1 from a high signal SL1, which denotes that the CPU 21 is resettable, to a low signal SL1, which denotes that the CPU 21 is non-resettable, upon input of a low signal SL5 (resetting signal) into the CPU 21. Accordingly, a low signal SL5 (resetting signal) is not input into the CPU 21 even if the capacity of the capacitor C1 is above a predetermined capacity due to closing of the power switch 14B continued after rebooting of the CPU 21. This prevents repeated resetting of the CPU 21 when the power switch 14B is continuously closed.

<Second Embodiment>

Next, a mobile phone 1 according to a second embodiment will be described. The mobile phone 1 according to the second embodiment has a modified reset detecting circuit 20 of the mobile phone 1 according to the first embodiment in order to put the state signal SL1, which is output from the CPU 21, to effective use when it becomes unstable. Also in the mobile phone 1 according to the second embodiment, power is turned off after the CPU 21 is rebooted. The rest are the same as in the mobile phone 1 according to the first embodiment, and therefore description thereof will not be repeated.

Figure 6:
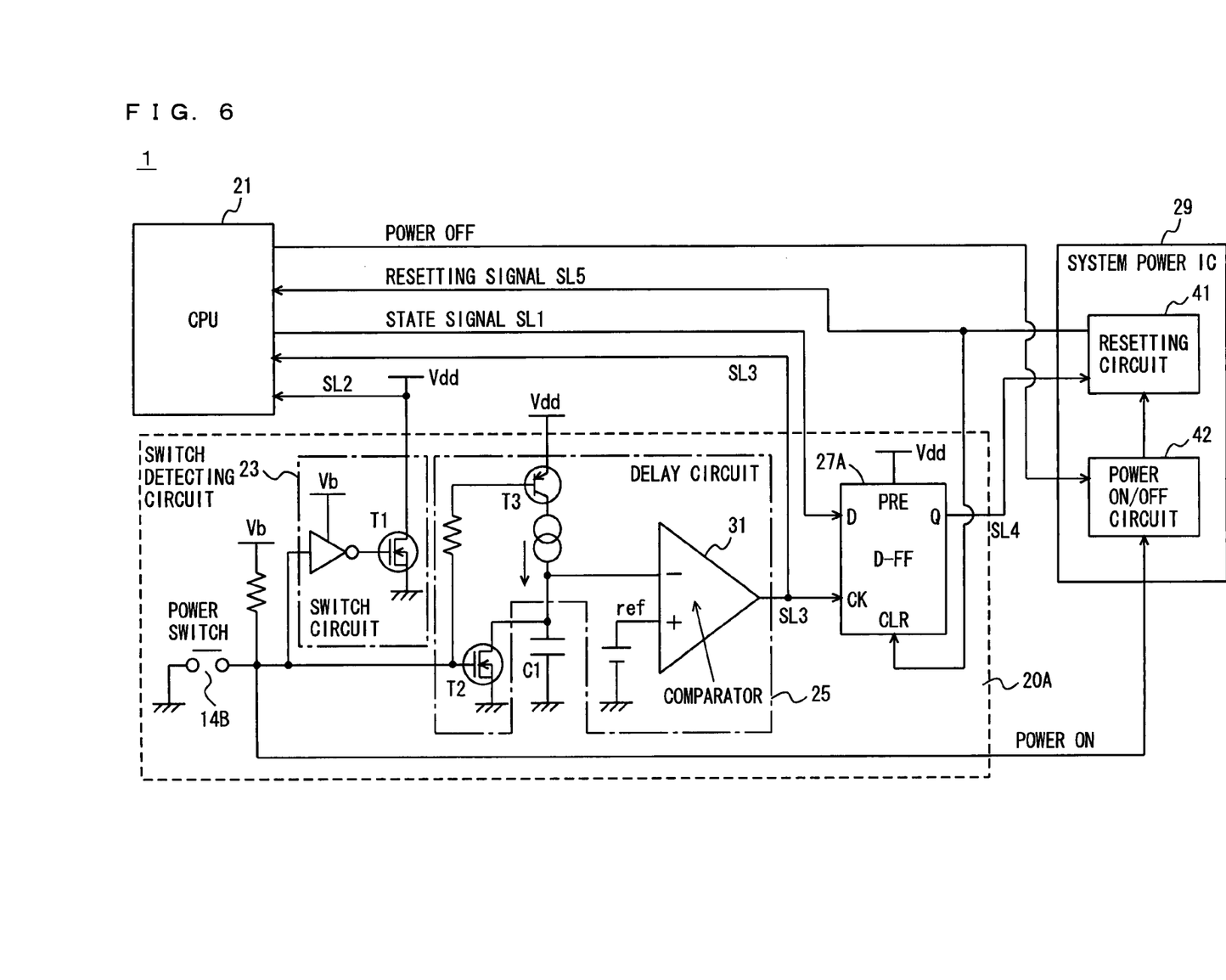
FIG. 6 is a block diagram of a mobile phone according to a second embodiment of the present invention including a reset detecting circuit.

FIG. 6 is a block diagram of the mobile phone according to the second embodiment of the present invention including a reset detecting circuit. Referring to FIG. 6, the mobile phone 1 according to the second embodiment is different from the mobile phone 1 according to the first embodiment shown in FIG. 3 in that the AND element 27 in the reset detecting circuit 20 is modified into a flip flop circuit 27A, and that the comparator 31 outputs the signal SL3 to the CPU 21 in addition to the flip flop circuit 27A. The rest are the same as in the mobile phone 1 according to the first embodiment, and therefore description thereof will not be repeated. Through an input D of the flip flop circuit 27A, the state signal SL1 is input from the CPU 21; through an input CK of the flip flop circuit 27A, the signal SL3 is input from the comparator 31; and through an input CLR of the flip flop circuit 27A, the signal SL5 is input from the resetting circuit 41. When the signal SL3 is high and the state signal SL1 is also high, the flip flop circuit 27A outputs through an output Q a high signal SL4 to the resetting circuit 41, and otherwise, the flip flop circuit 27A outputs through the output Q a low signal SL4 to the resetting circuit 41. Even in case of an unstable state signal SL1, the flip flop circuit 27A needs only one occurrence of the situation where the signal SL3 is high and the state signal SL1 is also high in order to output through the output Q a high signal SL4 to the resetting circuit 41. Following the output, the resetting circuit 41 changes the signal SL5 from a high signal SL5 to a low signal SL5. When the signal SL5, which is input through the input CLR of the flip flop circuit 27A, changes from a high signal SL5 to a low signal SL5, the flip flop circuit 27A keeps the output Q low until next time the input CK becomes high. Thus, after the signal SL5 is output by continued pressing of the power key 14A, the signal SL4 does not become high while pressing of the power key 14A is continued. This prevents re-resetting of the CPU 21 after resetting thereof is released by the resetting circuit 41.

In the CPU 21 according to the second embodiment, the state-signal changing processing shown in FIG. 4 is executed. In the second embodiment, where, when the signal SL5, which is input through the input CLR of the flip flop circuit 27A, changes from a high signal SL5 to a low signal SL5, the flip flop circuit 27A keeps the output Q low until next time the input CK becomes high, it is possible that in step S02 shown in FIG. 4, the CPU 21 detects a lapse of a predetermined period time after booting thereof without detecting that the power switch 14B is off. Setting the CPU 21 to render a low state signal SL1 high after the lapse of a predetermined period of time after booting of the CPU 21 secures that the CPU 21 is not reset even when the voltage of the capacitor C1 reaches the threshold voltage ref during the predetermined period of time after booting of the CPU 21.

Into the CPU 21 is input the signal SL3, which is output from the comparator 31. Immediately after rebooted by inputting a low signal SL5 (resetting signal), the CPU 21 detects the signal SL3 only once, and when the signal SL3 is high, outputs to the power ON/OFF circuit 42 a signal for turning power off. This turns the power of the mobile phone 1 into the OFF state. Thus, power is turned into the OFF state after the CPU 21 is reset and rebooted when the power key 14A is continuously pressed. This enables the user to be notified when to release the power key 14A.

Figure 7:
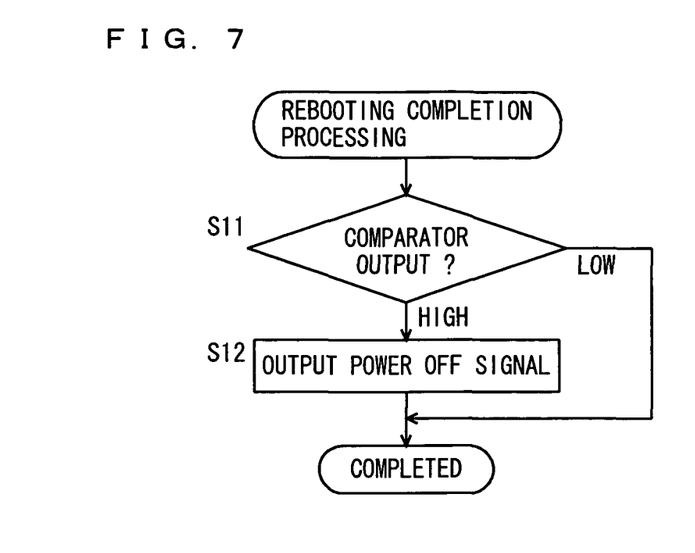
FIG. 7 is a flowchart showing the flow of a rebooting completion processing executed in the CPU of the mobile phone according to the second embodiment.

FIG. 7 is a flowchart showing the flow of a rebooting completion processing executed in the CPU of the mobile phone according to the second embodiment. The rebooting completion processing is executed only once immediately after booting of the CPU 21. Referring to FIG. 7, the CPU 21 detects whether the signal SL3, which is output from the comparator 31, is high (step S11). When the signal SL3 is high, the processing proceeds to step S12. When the signal SL3 is low, the processing is discontinued. In step S12, the CPU 21 outputs a power OFF signal to the power OFF circuit 42 in order to terminate the processing.

It is possible to adapt the mobile phone 1 according to the first embodiment to input the signal SL3, which is output from the comparator 31, into the CPU 21 in order to cause the CPU 21 to execute the rebooting completion processing shown in FIG. 7.

The mobile phone 1 according to the second embodiment is provided with the flip flow circuit 27A. When a low signal SL5 is input from the resetting circuit 41 upon output of a high signal SL4, the flip flow circuit 27A invalidates a high signal SL 3 (resetting signal) input continuously from the comparator 31. Accordingly, a low signal SL5 (resetting signal) is not input into the CPU 21 even if the capacity of the capacitor C1 is above a predetermined capacity due to closing of the power switch 14B continued after rebooting of the CPU 21. This prevents repeated resetting of the CPU 21 when the power switch 14B is continuously closed.

When the comparator 31 outputs a high signal SL3 after rebooting of the CPU 21, the CPU 21 switches power to the OFF state, thereby notifying the user that the CPU 21 has been reset. This also prevents repeated resetting of the CPU 21.

<Third Embodiment>

Next, a mobile phone according to a third embodiment will be described. In a mobile phone 1 according to the third embodiment, the CPU 21 of the mobile phone 1 according to the first or second embodiment is adapted to execute a switch changing processing and an opening-time interrupting processing. The rest are the same as in the mobile phone 1 according to the first or second embodiment, and therefore description thereof will not be repeated.

Figure 8:
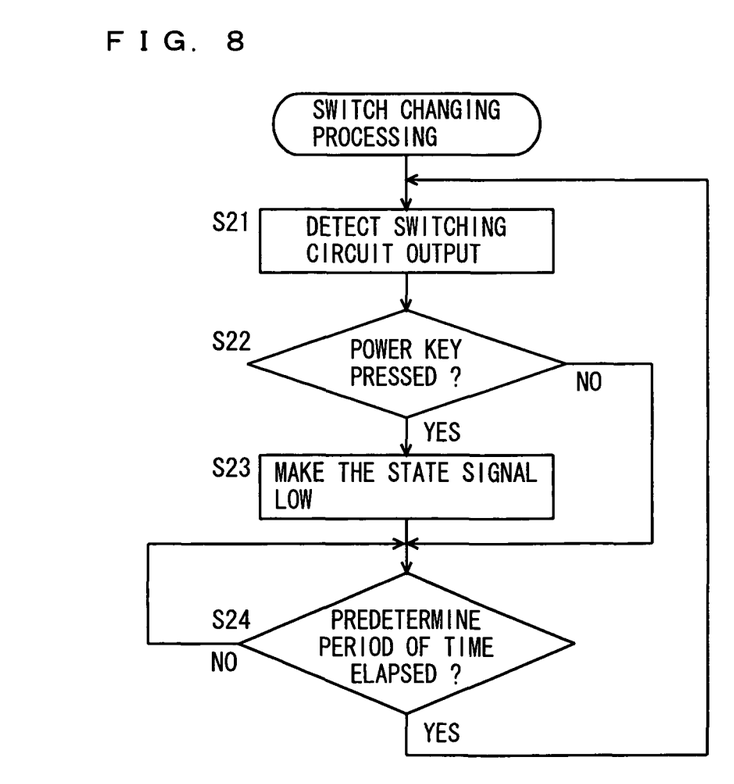
FIG. 8 is a flowchart showing the flow of a switch changing processing executed in the CPU of a mobile phone according to a third embodiment.

FIG. 8 is a flowchart showing the flow of a switch changing processing executed in the CPU of the mobile phone according to the third embodiment. The switch changing processing is executed continuously after booting of the CPU 21. Referring to FIG. 8, the CPU 21 detects the signal SL2, which is output from the switching circuit 23 (step S21). The signal SL2, output from the switching circuit 23, becomes low when the power switch 14B is closed by pressing the power key 14A, and becomes high when the power switch 14B is opened. The CPU 21 then judges whether the power key 14A is pressed (step S22). When the power key 14A is pressed, the processing proceeds to step S23, and when the power key 14A is not pressed, the processing proceeds to step S24. When the signal SL2 detected in step S21 is low, the CPU 21 judges that the power key 14A is pressed, and when the signal SL2 is high, the CPU 21 judges that the power key 14A is not pressed. In step S23, the CPU 21 renders the state signal low, and the processing proceeds to step S24. After detecting output of the switching circuit 23 in step S21, the CPU 21 turns into a stand-by state ("NO" in step S24) for a predetermined period of time, and the processing proceeds to step S21 after the predetermined period of time elapses. That is, the CPU 21 detects the signal SL2, which is output from the switching circuit 23, at predetermined time intervals.

Figure 9:
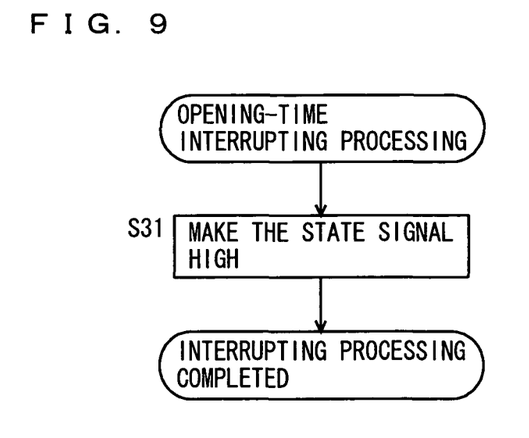
FIG. 9 is a flowchart showing the flow of an opening-time interrupting processing executed in the CPU of the mobile phone according to the third embodiment.

FIG. 9 is a flowchart showing the flow of an opening-time interrupting processing executed in the CPU of the mobile phone according to the third embodiment. The opening-time interrupting processing is executed by the CPU 21 when the signal SL2, which is input into the CPU 21 from the switching circuit 23, changes from a low signal SL2 to a high signal SL2. Referring to FIG. 9, the CPU 21 renders the state signal high (step S31), and the processing terminates. The open changing processing has higher priority for being executed by the CPU 21 than the switch changing processing. Even if the CPU 21 runs away after the state signal SL1 is rendered low in step S23 of the switch changing processing, the open changing processing is executed, which renders the state signal SL1 high. It is preferable that the open changing processing has the same level of priority as or higher priority than the processing of clearing the watch dog timer.

According to the mobile phone 1 of the third embodiment, the state signal SL1 is low while the power key 14A is being pressed. When the pressing of the power key 14A is released, the state signal SL1 becomes high. Thus, while the switch changing processing is executed by the CPU 21, the reset detecting circuit 20 does not output a high signal SL4. The AND element 27 or the flip flop circuit 27A outputs a high signal SL4 (resetting signal) only when the power key 14A is continuously pressed under the state where an application program runs away in the CPU 21 and thus the switch changing processing cannot be executed.

In the mobile phone 1 according to the first or second embodiment, when the CPU 21 turns off power by detecting continuous pressing of the power key 14A for a predetermined period of time, it is necessary, in order for the CPU 21 to turn off power before being reset, that the period of time for the voltage of the capacitor C1 of the reset detecting circuit 20 to reach the threshold voltage ref is set to be longer than the period of time for pressing measured by the CPU 21. In the mobile phone 1 according to the third embodiment, on the other hand, it is sufficient that the period of time for the voltage of the capacitor C1 of the reset detecting circuit 20 to reach the threshold voltage ref is longer than each of the time intervals for the CPU 21 to, when executing the switch changing processing, detect the signal SL2, which is output from the switching circuit 23. Thus, the mobile phone 1 according to the third embodiment has a shorter period of time before resetting of the CPU 21. The period of time for the voltage of the capacitor C1 of the reset detecting circuit 20 to reach the threshold voltage ref is varied by fluctuation of the capacity of the capacitor C1 caused by temperature and variation in the performance of circuit parts. The range of variation of the time period becomes larger as the period of time for the voltage of the capacitor C1 of the reset detecting circuit 20 to reach the threshold voltage ref becomes longer. Thus, the mobile phone 1 according to the third embodiment has reduced variation in the period of time before resetting of the CPU 21.

In the mobile phone 1 according to the third embodiment, since the CPU 21 detects the output of the switching circuit 23 at predetermined time intervals, the CPU 21 is not reset while the CPU 21 detects that the power switch 14B is closed. Even if the CPU 21 cannot detect that the power switch 14B is closed when the power switch 14B is actually closed, outputting a high state signal SL1, which denotes that the CPU 21 is resettable, enables resetting of the CPU 21. The period of time for the voltage of the capacitor C1 of the reset detecting circuit 20 to be condensed above the threshold voltage ref only needs to be longer than each of the time intervals for detecting that the power switch 14B is closed, thereby shortening the period of time before the power switch 14B is closed and the CPU 21 is reset.

Further, since the CPU 21 outputs a high state signal SL1 (S31), which denotes that the CPU 21 is resettable, upon change of the output of the switching circuit 23 from a low (ON) output to a high (OFF) output, the CPU 21 can be reliably reset even if the CPU 21 cannot detect that power switch 14B is closed when the power switch 14B is actually closed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A mobile information terminal comprising:
a controlling portion configured to execute an application program; and
a resetting portion configured to output a resetting signal for rebooting said controlling portion in a case where a predetermined operation by a user is accepted, wherein:
said controlling portion includes a determining portion to determine whether an audible security sound emitted by the mobile information terminal is activated to indicate a condition when resetting said controlling portion is not permitted, and a state-signal outputting portion to output a state signal denoting either a resettable state or a non-resettable state of said controlling portion, wherein said state-signal outputting portion outputs the state signal denoting the non-resettable state in a case where the determining portion determines that the audible security sound is activated, after the state signal denoting the resettable state is output; and
said resetting portion includes a judging portion to output to said controlling portion said resetting signal on condition that said state signal denotes the resettable state of said controlling portion.

2. The mobile information terminal according to claim 1, further comprising a switch to receive an instruction for switching power between an ON state and an OFF state, wherein:
the predetermined operation includes an operation for closing said switch for a predetermined period of time; and
said resetting portion includes:
a capacitor; and
a delay circuit to supply constant current to said capacitor while said switch is closed and to output said resetting signal while the capacity of said capacitor is above a predetermined capacity.

3. The mobile information terminal according to claim 2, wherein said judging portion further includes a resetting-signal invalidating portion to, upon output of said resetting signal to said controlling portion, invalidate a resetting signal input continuously from said delay circuit.

4. The mobile information terminal according to claim 2, wherein said controlling portion switches the power to the OFF state when said delay circuit outputs the resetting signal immediately after booting of said controlling portion.

5. The mobile information terminal according to claim 2, wherein said delay circuit causes said capacitor to discharge while said switch is opened.

6. The mobile information terminal according to claim 2, wherein said controlling portion further includes:
a measuring portion to measure a period of time for closure of said switch; and
a power-off portion to turn power into the OFF state upon closure of said switch for a predetermined period of time, wherein
said delay circuit has a longer period of time from commencement of condensation of said capacitor to attainment of said predetermined capacity than said predetermined period of time for closure of said switch.

7. The mobile information terminal according to claim 1, wherein said state-signal outputting portion outputs the state signal denoting the non-resettable state of said controlling portion upon input of said resetting signal.

8. The mobile information terminal according to claim 1, further comprising a switch to receive an instruction for switching power between an ON state and an OFF state, and a switching circuit to output a signal denoting the ON state when said switch is closed and output a signal denoting the OFF state when said switch is opened, wherein
the predetermined operation includes an operation for closing said switch for a predetermined period of time; and
said state-signal outputting portion further includes a switch changing portion to detect an output from said switching circuit at predetermined time intervals and to output said state signal denoting the non-resettable state of said controlling portion while said switch changing portion detects the signal denoting the ON state output from said switching circuit.

9. The mobile information terminal according to claim 8, wherein:
said controlling portion further includes an opening-time changing portion to output said state signal denoting the resettable state of said controlling portion upon detection of a change of the signal denoting the ON state to the signal denoting the OFF state output from said switching circuit; and
said opening-time changing portion has higher priority for being executed by the controlling portion than at least said switch changing portion.

10. The mobile information terminal according to claim 8, wherein said delay circuit has a longer period of time from commencement of condensation of said capacitor to attainment of said predetermined capacity than each of said time intervals for said switch changing portion to detect an output from said switching circuit.

11. The mobile information terminal according to claim 1, further comprising a switch to receive an instruction for switching power between an ON state and an OFF state, wherein the predetermined operation includes an operation for closing said switch for a predetermined period of time.

12. A mobile information terminal comprising:
a controlling portion configured to execute an application program; and
a resetting portion to reboot said controlling portion in the case where a predetermined operation by a user is accepted, wherein:
said controlling portion includes a determining portion to determine whether an audible security sound emitted by the mobile information terminal is activated to indicate a condition when resetting said controlling portion is not permitted, and a state-signal outputting portion to output a state signal denoting either a stoppable executing state or an unstoppable executing state of said controlling portion, wherein said state-signal outputting portion outputs the state signal denoting the non-resettable state in the case where the determining portion determines that the audible security sound is activated, after the state signal denoting the resettable state is output; and
said resetting portion avoids rebooting of said controlling portion in the unstoppable executing state of said controlling portion in the case where the predetermined operation by the user is accepted.

13. The mobile information terminal according to claim 1, wherein said state-signal outputting portion outputs a state signal denoting a non-resettable state during the time when a predetermined application program is executed, while otherwise outputting a state signal denoting a resettable state.

14. The mobile information terminal according to claim 12, wherein said state-signal outputting portion outputs the state signal denoting the non-resettable state during the time when a predetermined application program is executed, while otherwise outputting the state signal denoting the resettable state.

* * * * *